(12) United States Patent
Kim et al.

(10) Patent No.: US 10,260,476 B2
(45) Date of Patent: Apr. 16, 2019

(54) DEVICE FOR PREVENTING BACK FIRE OF ENGINE AND METHOD USING THE SAME

(71) Applicant: Hyundai Motor Company, Seoul (KR)

(72) Inventors: Jonghyuck Kim, Suwon-si (KR); Kyeong Il Choi, Suwon-si (KR); Sung Ha Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 146 days.

(21) Appl. No.: 15/377,862

(22) Filed: Dec. 13, 2016

(65) Prior Publication Data

US 2018/0038336 A1  Feb. 8, 2018

(30) Foreign Application Priority Data

Aug. 5, 2016  (KR) .................. 10-2016-0100056

(51) Int. Cl.
| | |
|---|---|
| *F02P 5/15* | (2006.01) |
| *F02P 5/145* | (2006.01) |
| *F02B 43/10* | (2006.01) |
| *F02D 19/02* | (2006.01) |
| *F02D 35/02* | (2006.01) |
| *F02D 41/22* | (2006.01) |
| *F02D 41/00* | (2006.01) |
| *F02P 11/06* | (2006.01) |
| *F02P 11/02* | (2006.01) |

(52) U.S. Cl.
CPC .............. *F02P 5/145* (2013.01); *F02B 43/10* (2013.01); *F02D 19/025* (2013.01); *F02D 35/028* (2013.01); *F02D 41/0025* (2013.01); *F02D 41/22* (2013.01); *F02P 5/1502* (2013.01); *F02B 2043/103* (2013.01); *F02D 2200/0406* (2013.01); *F02D 2200/0414* (2013.01); *F02P 11/02* (2013.01); *F02P 11/06* (2013.01); *Y02T 10/32* (2013.01); *Y02T 10/46* (2013.01)

(58) Field of Classification Search
CPC . F02P 5/145; F02P 11/06; F02B 43/10; F02B 2043/103; F02D 19/025; F02D 35/028
USPC ...................................................... 123/406.14
See application file for complete search history.

(56) References Cited

U.S. PATENT DOCUMENTS

| | | | | |
|---|---|---|---|---|
| 5,163,316 A | * | 11/1992 | Toyoda ................... | F02D 35/02 60/277 |
| 5,645,032 A | * | 7/1997 | Motose ..................... | F02D 9/02 123/339.16 |
| 5,699,767 A | * | 12/1997 | Notsu ....................... | F02D 9/06 123/27 GE |

(Continued)

FOREIGN PATENT DOCUMENTS

| | | |
|---|---|---|
| JP | 2001-221073 (A) | 8/2001 |
| JP | 2004-340065 A | 12/2004 |

(Continued)

*Primary Examiner* — Joseph J Dallo
*Assistant Examiner* — Yi-Kai Wang
(74) *Attorney, Agent, or Firm* — Morgan, Lewis & Bockius LLP

(57) ABSTRACT

A method for preventing back fire of an engine by a device for preventing back fire of an engine, may include monitoring operating information of the engine; determining whether the back fire occurs by using the operating information of the engine; and controlling an ignition timing to be retarded when the back fire occurs as the determination result.

9 Claims, 4 Drawing Sheets

(56) References Cited

U.S. PATENT DOCUMENTS

| | | | | |
|---|---|---|---|---|
| 2002/0092497 | A1* | 7/2002 | Saito | F02P 5/1504 |
| | | | | 123/406.5 |
| 2004/0074465 | A1* | 4/2004 | Hunt | F02D 41/064 |
| | | | | 123/179.15 |
| 2006/0037588 | A1* | 2/2006 | Osanai | F02D 41/0032 |
| | | | | 123/520 |
| 2006/0174624 | A1* | 8/2006 | Grabowski | B60K 6/40 |
| | | | | 60/709 |
| 2009/0293842 | A1* | 12/2009 | Akazaki | F02D 35/023 |
| | | | | 123/406.41 |

FOREIGN PATENT DOCUMENTS

| | | |
|---|---|---|
| KR | 10-2002-0055754 A | 7/2002 |
| KR | 10-0527446 (B1) | 11/2005 |
| KR | 10-2011-0058901 A | 6/2011 |
| KR | 10-1063280 (B1) | 9/2011 |

* cited by examiner

DEVICE FOR PREVENTING BACK FIRE OF ENGINE AND METHOD USING THE SAME

CROSS-REFERENCE TO RELATED APPLICATION

The present application claims priority to Korean Patent Application No. 10-2016-0100056 filed on Aug. 5, 2016, the entire contents of which is incorporated herein for all purposes by this reference.

BACKGROUND OF THE INVENTION

Field of the Invention

The present invention relates to a device for preventing back fire of an engine and a back fire preventing method using the same.

Description of Related Art

As a part of efforts for solving an environmental problem, low-pollution realization of a vehicle, which is recognized as a main culprit of city air pollution has emerged as an urgent subject of all vehicle manufacturers and components enterprises.

As a result, a lot of efforts have been made to develop a vehicle which uses alternative energy to significantly reduce emission of harmful substances as compared with gasoline or diesel.

As a part thereof, the diffusion of vehicles using as fuel compressed natural gas (CNG) which is high in combustion efficiency, causes less atmospheric pollution, and is economic as compared with the gasoline, and the like has been expanded.

However, in the existing CNG engine, a back fire phenomenon may occur, in which uncombusted fuel flows backward toward an intake pipe to be combusted in the intake pipe.

Such a back fire phenomenon occurs due to leaked current, an abnormal valve interval, and an abnormal ignition timing. In addition, in the case of the back fire phenomenon, an abnormal pressure is generated due to intake combustion, and as result, an intake hose and a throttle body valve are damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for preventing back fire of an engine and a back fire preventing method using the same, which can prevent a back fire by monitoring an operating state of the engine.

Various aspects of the present invention are directed to providing a method for preventing back fire of an engine by a device for preventing back fire of an engine, including: monitoring operating information of the engine; determining whether the back fire occurs by using the operating information of the engine; and controlling an ignition timing to be retarded when the back fire occurs as the determination result.

The operating information of the engine may include at least one of an RPM of the engine, an intake pressure, an intake temperature, an opening level of a throttle valve, and a control current value of the throttle valve.

The determining of whether the back fire occurs may include comparing the intake pressure with a pressure set value, comparing the intake temperature with a temperature set value when the intake pressure is more than a predetermined maximum pressure value or the intake pressure is less than a predetermined minimum pressure value, and determining that the back fire occurs when the intake temperature is more than a maximum temperature value for a predetermined time or more.

The determining of whether the back fire occurs may include comparing the opening level of the throttle valve with a reference opening level, comparing the control current value of the throttle valve with a reference value when the opening level of the throttle valve is more than the reference opening level, and determining that the back fire occurs when the control current value of the throttle valve is more than the reference value.

The controlling of the ignition timing to be retarded may include estimating a cylinder in which the back fire occurs by using an RPM for each cylinder, and retarding an ignition timing of the cylinder in which the back fire is estimated to occur.

The method may further include determining a back fire occurrence ratio and when the determined back fire occurrence ratio is equal to or more than an occurrence ratio set value, turning on a warning lamp.

Various aspects of the present invention are directed to providing a device for preventing back fire of an engine, including: a monitoring device monitoring operating information of a compressed natural gas (CNG) engine; and a control device determining whether the back fire occurs by using the operating information of the CNG engine and controlling an ignition timing to be retarded when the back fire occurs as the determination result.

The monitoring device may monitor at least one of an RPM of the engine, an intake pressure, an intake temperature, an opening level of a throttle valve, and a control current value of the throttle valve.

The control device may include a back fire determining device comparing the operating information of the CNG engine with a set value to determine whether the back fire occurs and determining a cylinder in which the back fire occurs by using an RPM for each cylinder, and an ignition control device controlling the ignition timing of the cylinder in which the back fire occurs.

The back fire determining device may compare the intake pressure with a pressure set value and when the intake pressure is more than a predetermined maximum pressure value or the intake pressure is less than a predetermined minimum pressure value, the back fire determining device may determine that the back fire occurs.

The back fire determining device may compare the intake temperature with a temperature set value and when the intake temperature is more than a maximum temperature value for a predetermined time or more, the back fire determining device may determine that the back fire occurs.

The back fire determining device may determine that the back fire occurs when the opening level of the throttle valve is more than a reference opening level or the control current value of the throttle valve is more than a reference value.

The control device may determine a back fire occurrence ratio and when the determined back fire occurrence ratio is equal to or more than an occurrence ratio set value, the control device may turn on a warning lamp.

According to exemplary embodiments of the present invention, whether back fire occurs is predicted by using operating variables of an engine and an ignition timing of a cylinder in which the back fire occurs is retarded to prevent the engine from being damaged and provide an environment to improve fuel efficiency and drivability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
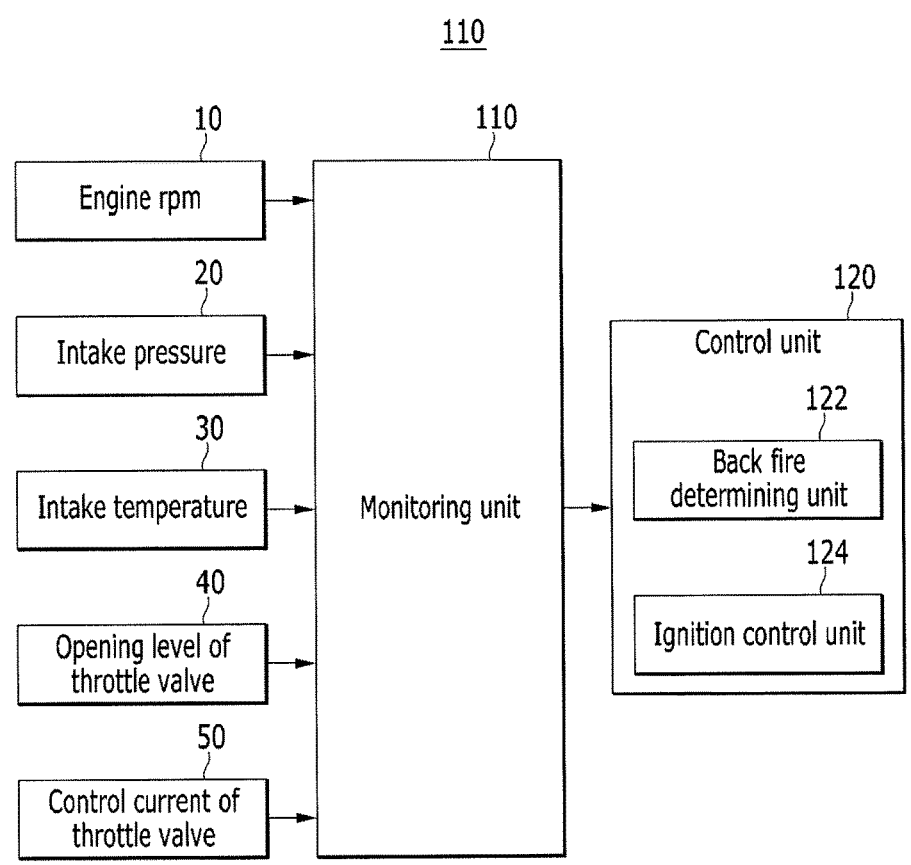
FIG. 1 is a diagram schematically illustrating a structure of a device for preventing back fire of a CNG engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, unless explicitly described to the contrary, the word "comprise" and variations such as "comprises" or "comprising", will be understood to imply the inclusion of stated elements but not the exclusion of any other elements.

Like reference numerals designate like elements throughout the specification.

"Vehicle", "car", "vehicular", "automobile", or other similar terms used in the present specification include cars including sports utility vehicles (SUV), buses, trucks, and various commercial vehicles, ships including various types of boats or vessels, airplanes, and automobiles including things similar thereto and include a hybrid vehicle, an electric vehicle, a plug-in hybrid electric vehicle, a hydrogen fuel vehicle, and other alternative fuel (e.g., fuel acquired from resources other than petroleum) vehicles.

Additionally, some methods may be executed by at least one controller. The term "controller" represents a hardware device including a memory and a processor configured to execute one or more steps analyzed in an algorithm structure. The memory is configured to store algorithm steps and the processor is configured to particularly execute the algorithm steps in order to execute one or more processors disclosed below.

Furthermore, control logic of the present invention may be implemented by a medium which is not temporary and is computer-readable on a computer-readable means including executable program commands executed by the processor, the controller, or a device similar thereto. Examples of the computer-readable means are not limited thereto, but include a ROM, a RAM, a CD-ROM, a magnetic tape, a floppy disk, a flash drive, a smart card, and an optical data storage device. A computer-readable reproducing medium may be stored and executed while being distributed to a computer system connected by a network, for example, in a distribution method by a telematics server or a controller area network (CAN).

Hereinafter, a device for preventing back fire of an engine and a back fire preventing method using the same according to an exemplary embodiment of the present invention will be described in detail with reference to FIGS. 1 to 4.

FIG. 1 is a diagram schematically illustrating a structure of a device for preventing back fire of a CNG engine according to an exemplary embodiment of the present invention. In the instant case, only a schematic configuration of the device for preventing back fire, which is used for a description according to the exemplary embodiment of the present invention is just illustrated and the device for preventing back fire is not limited to such a configuration.

Referring to FIG. 1, the device 100 for preventing back fire of a CNG engine according to the exemplary embodiment of the present invention includes a monitoring device 110 and a control device 120.

The monitoring device 110 detects operating information of the compressed natural gas (CNG) engine and provides the detected operating information to the control device 120.

The monitoring device 110 monitors at least one of an RPM 10 of the engine, an intake pressure 20 of an intake manifold, an intake temperature 30, an opening level 40 of a throttle valve, and a control current value 50 of the throttle valve.

The control device 120 determines whether the back fire occurs by using the operating information of the CNG engine and when the back fire occurs, the control device 120 controls an ignition timing of a cylinder to be retarded.

Further, the control device 120 determines a back fire occurrence ratio and when the determined back fire occurrence ratio is equal to or more than an occurrence ratio set value, the control device 120 controls a warning lamp to be turned on. Herein, the back fire occurrence ratio includes a ratio of the number of ignition cases of a flame ignition method by an ignition plug and the number of back fire occurrence cases in the CNG engine.

The control device 120 includes a back fire determining device 122 and an ignition control device 124 according to the exemplary embodiment of the present invention.

The back fire determining device 122 compares the opening information of the CNG engine with a set value to determine whether the back fire occurs and determines the cylinder in which the back fire occurs by using the RPM for each cylinder. Herein, the operating information of the engine includes at least one of the RPM of the engine, the intake pressure, the intake temperature, the opening level of the throttle valve, and the control current value of the throttle valve.

For example, the back fire determining device 122 compares the intake pressure with a pressure set value and when the intake pressure is more than a predetermined maximum pressure value or the intake pressure is less than a predetermined minimum pressure value, the back fire determining device 122 determines that the back fire occurs.

Further, the back fire determining device 122 compares the intake temperature with a set value and when the intake temperature is higher than a maximum temperature value for a predetermined time or more, the back fire determining device 122 may determine that the back fire occurs.

In addition, the back fire determining device 122 may determine that the back fire occurs even when the opening level of the throttle valve is more than a reference opening level or the control current value of the throttle valve is more than a reference value.

The ignition control device 124 controls the ignition timing of the cylinder in which the back fire occurs. For example, the ignition control device 124 may control the ignition timing of the cylinder in which the back fire is estimated to occur to be retarded by approximately 2 degrees.

For such a purpose, the control device 120 may be implemented as one or more microprocessors that operate by a set program and the set program may be programmed to perform respective steps of a method for preventing back fire according to an exemplary embodiment of the present invention.

Figure 2:
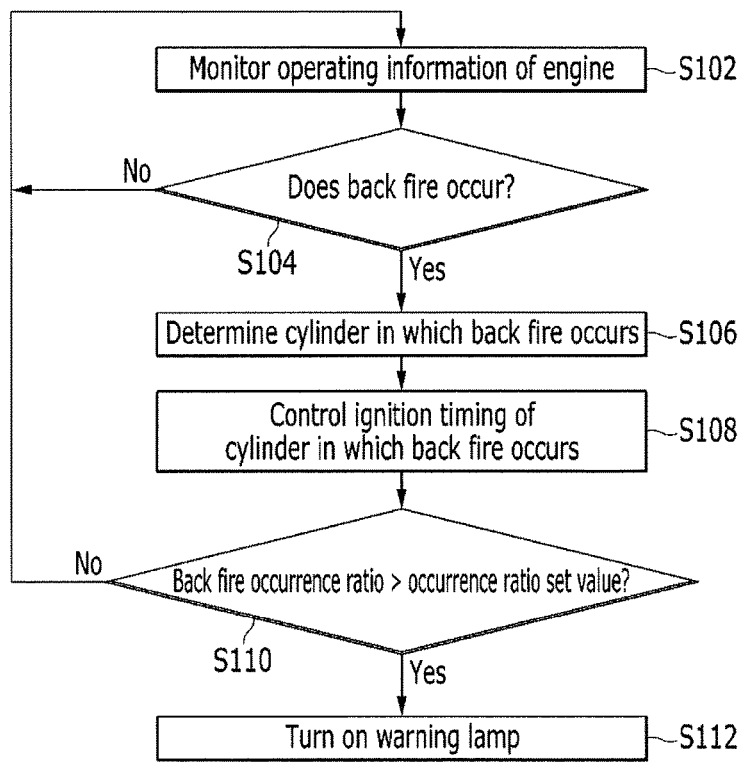
FIG. 2 is a flowchart schematically illustrating a process for preventing back fire of a CNG engine according to an exemplary embodiment of the present invention.

FIG. 2 is a flowchart schematically illustrating a process for preventing back fire of a CNG engine according to an exemplary embodiment of the present invention. A flowchart given below will be described by using the same reference numeral in with the configuration of FIG. 1.

Referring to FIG. 2, the device 100 for preventing back fire of a CNG engine according to the exemplary embodiment of the present invention monitors the operating information of the CNG engine (S102). Herein, the operating information of the engine includes at least one of the RPM of the engine, the intake pressure, the intake temperature, the opening level of the throttle valve, and the control current value of the throttle valve.

In addition, the device 100 for preventing back fire according to the exemplary embodiment of the present invention determines whether the back fire occurs by using the operating information of the engine and determines the cylinder in which the back fire occurs by using the RPM for each cylinder (S104 and S106).

In the instant case, the device 100 for preventing back fire according to the exemplary embodiment of the present invention estimates that the back fire occurs in the corresponding cylinder when a difference between an RPM when after top dead center (ADTC) is 15° and an RPM when the ATDC is 75° is equal to or more than a set value in a specific cylinder. In addition, the device 100 for preventing back fire compares the RPM difference value with an RPM at a next combustion cycle of the corresponding cylinder to determine the cylinder in which the back fire occurs.

Further, the device 100 for preventing back fire according to the exemplary embodiment of the present invention controls the ignition timing of the cylinder in which the back fire occurs to be retarded (S108). This is to minimize an overlap section by retarding the ignition timing when the back fire occurs due to an error of the overlap section of an outtake valve and the intake valve.

In addition, the device 100 for preventing back fire may control the ignition timing of the corresponding cylinder to be retarded by approximately 2 degrees within a range not to exceed output and emission of the engine whenever the back fire occurs in the engine.

Further, the device 100 for preventing back fire according to the exemplary embodiment of the present invention determines a back fire occurrence ratio and when the determined back fire occurrence rate is equal to or more than an occurrence rate set value, the control device 120 controls a warning lamp to be turned on (S110 and S112). Herein, the back fire occurrence ratio includes a ratio of the number of ignition cases of a flame ignition method by an ignition plug and the number of back fire occurrence cases in the CNG engine.

Figure 3:
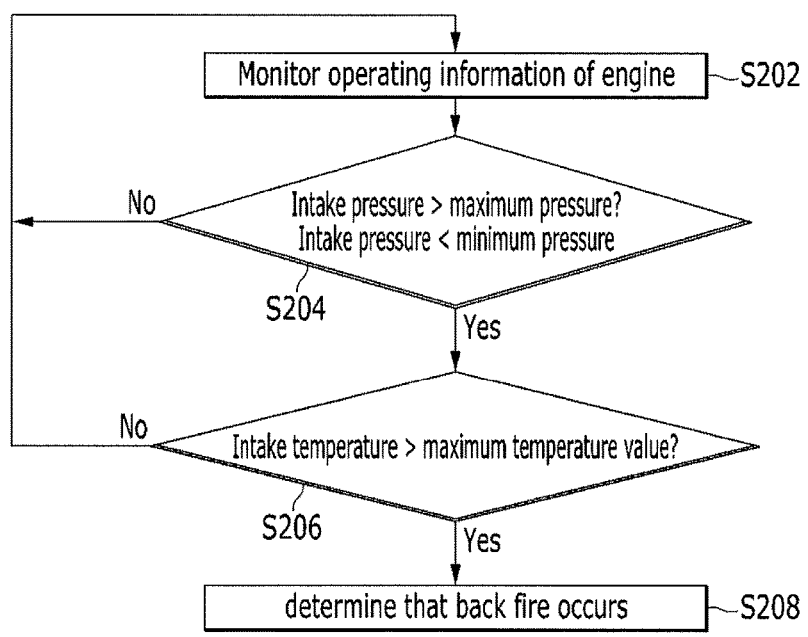
FIG. 3 is a flowchart schematically illustrating a process for determining whether back fire occurs in a CNG engine according to an exemplary embodiment of the present invention.

FIG. 3 is a flowchart schematically illustrating a process for determining whether back fire occurs in a CNG engine according to an exemplary embodiment of the present invention.

Referring to FIG. 3, the device 100 for preventing back fire according to the exemplary embodiment of the present invention monitors the operating information of the engine (S202).

In addition, the device 100 for preventing back fire according to the exemplary embodiment of the present invention compares the intake pressure with a predetermined pressure set value (S204).

In the instant case, when the intake pressure is more than a predetermined maximum pressure for a predetermined time or more or the intake pressure is less than a predetermined minimum pressure for a predetermined time or more, the intake temperature is compared with a temperature set value (S206).

In addition, the device 100 for preventing back fire according to the exemplary embodiment of the present invention determines that the back fire occurs when the intake temperature is more than a maximum temperature value (S208).

Figure 4:
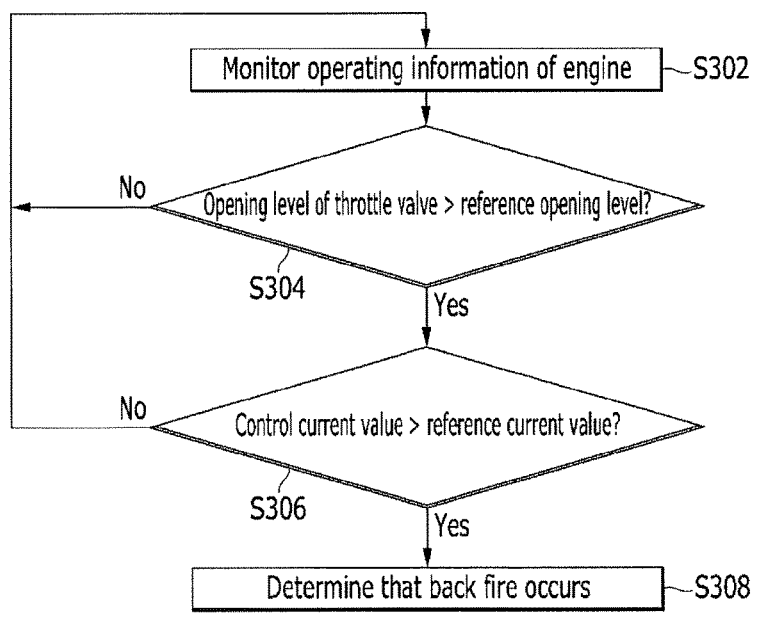
FIG. 4 is a flowchart schematically illustrating a process for determining whether back fire occurs in a CNG engine according to another exemplary embodiment of the present invention.

FIG. 4 is a flowchart schematically illustrating a process for determining whether back fire occurs in a CNG engine according to another exemplary embodiment of the present invention.

Referring to FIG. 4, the device 100 for preventing back fire according to the exemplary embodiment of the present invention monitors the operating information of the engine (S302).

In addition, the device 100 for preventing back fire according to the exemplary embodiment of the present invention compares the opening level of the throttle valve with a predetermined reference opening level (S304).

Moreover, the device 100 for preventing back fire according to the exemplary embodiment of the present invention compares the control current value of the throttle valve with a current reference value when the opening level of the throttle valve is more than the reference opening level (S306). Herein, the opening level of the throttle valve, the predetermined reference opening level, the control current value, and the current reference value may include a differentiation value which is instantaneously varied for a predetermined short time according to the combustion of the engine.

The device 100 for preventing back fire according to the exemplary embodiment of the present invention determines that the back fire occurs when the control current value is more than a current reference value (S308).

For example, when strong intake combustion occurs by the back fire, the opening level of the throttle valve operates in a direction in which the throttle valve is momentarily opened. In addition, the reason is that as control current is applied to the throttle valve in a reverse direction to maintain the existing opening level, and as a result, current is consumed with the current reference value or more.

Further, when weak intake combustion occurs by the back fire, since mixed gas in intake gas is completely consumed, instantaneous negative pressure is applied. In the instant case, the throttle valve operates in a direction to be closed and the control current is consumed more than necessary to maintain the existing opening level.

As described above, the device for preventing back fire according to the exemplary embodiment of the present invention predicts whether back fire occurs by using operating variables of an engine and retards an ignition timing of a cylinder in which the back fire occurs to prevent the engine from being damaged and provide an environment to improve fuel efficiency and drivability.

The exemplary embodiments of the present invention described above can be implemented not through the apparatus and the method and can be implemented through a program which realizes a function corresponding to a configuration of the exemplary embodiments of the present invention or a recording medium having the program recorded therein. The recording medium may be executed even by a user terminal as well as a server.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A method for preventing back fire of an engine by a device for preventing the back fire of the engine, the method comprising:
    monitoring operating information of the engine;
    determining whether the back fire occurs by using the operating information of the engine; and
    controlling an ignition timing to be retarded when the back fire occurs as the determination result,
    wherein the determining of whether the back fire occurs includes:
        comparing an intake pressure with a predetermined pressure value,
        comparing an intake temperature with a predetermined temperature value when the intake pressure is more than a predetermined maximum pressure value or the intake pressure is less than a predetermined minimum pressure value, and
        determining that the back fire occurs when the intake temperature is more than a maximum temperature value for a predetermined time or more.

2. The method of claim 1, wherein the operating information of the engine includes at least one of an RPM of the engine, the intake pressure, the intake temperature, an opening level of a throttle valve, and a control current value of the throttle valve.

3. The method of claim 1, wherein the determining of whether the back fire occurs includes:
    comparing an opening level of a throttle valve with a reference opening level,
    comparing a control current value of the throttle valve with a predetermined value when the opening level of the throttle valve is more than the reference opening level, and
    determining that the back fire occurs when the control current value of the throttle valve is more than the predetermined value.

4. The method of claim 1, wherein the controlling of the ignition timing to be retarded includes:
    estimating a cylinder in which the back fire occurs by using an RPM for each cylinder, and
    retarding the ignition timing of the cylinder in which the back fire is estimated to occur.

5. The method of claim 4, further including:
    determining a back fire occurrence ratio and when the determined back fire occurrence ratio is equal to or more than an occurrence ratio set value, turning on a warning lamp.

6. A device for preventing back fire of an engine, the device including:
    a monitoring device monitoring operating information of a compressed natural gas (CNG) engine; and
    a control device determining whether the back fire occurs by using the operating information of the CNG engine and controlling an ignition timing to be retarded when the back fire occurs as the determination result,
    wherein the control device includes:
        a back fire determining device comparing the operating information of the CNG engine with a set value to determine whether the back fire occurs and determining a cylinder in which the back fire occurs by using an RPM for each cylinder, and
        an ignition control device controlling the ignition timing of the cylinder in which the back fire occurs,
    wherein the back fire determining device is configured to compare an intake pressure with a predetermined pressure value, and when the intake pressure is more than a predetermined maximum pressure value or the intake pressure is less than a predetermined minimum pressure value, the back fire determining device is configured to determine that the back fire occurs, and
    wherein the back fire determining device, compares an intake temperature with a predetermined temperature value, and when the intake temperature is more than a maximum temperature value for a predetermined time or more, the back fire determining device is configured to determine that the back fire occurs.

7. The device of claim 6, wherein the monitoring device is configured to monitor at least one of the RPM of the engine, the intake pressure, the intake temperature, an opening level of a throttle valve, and a control current value of the throttle valve.

8. The device of claim 6, wherein the back fire determining device is configured to determine that the back fire occurs when an opening level of a throttle valve is more than a reference opening level or a control current value of the throttle valve is more than a predetermined value.

9. The device of claim 6, wherein the control device is configured to determine a back fire occurrence ratio and when the determined back fire occurrence ratio is equal to or more than an occurrence ratio set value, the control device operates a warning lamp.

* * * * *